Feb. 24, 1931. L. F. BURGER 1,793,586
AUTOMATIC IMPULSE COUPLING FOR MAGNETOS
Filed May 19, 1928 4 Sheets-Sheet 2
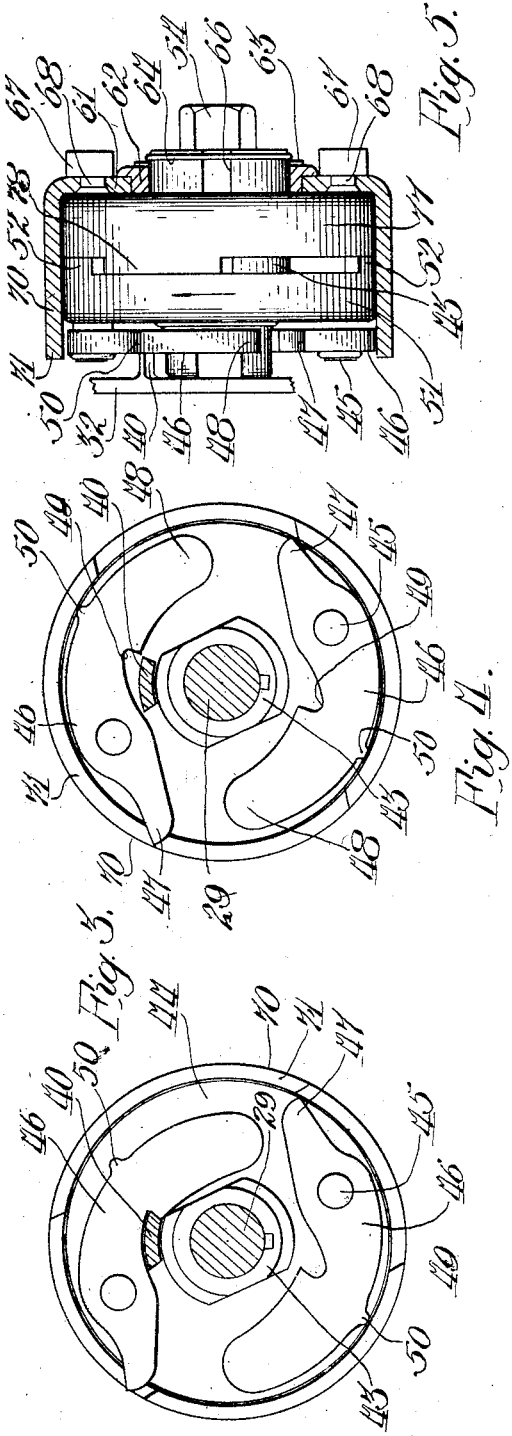
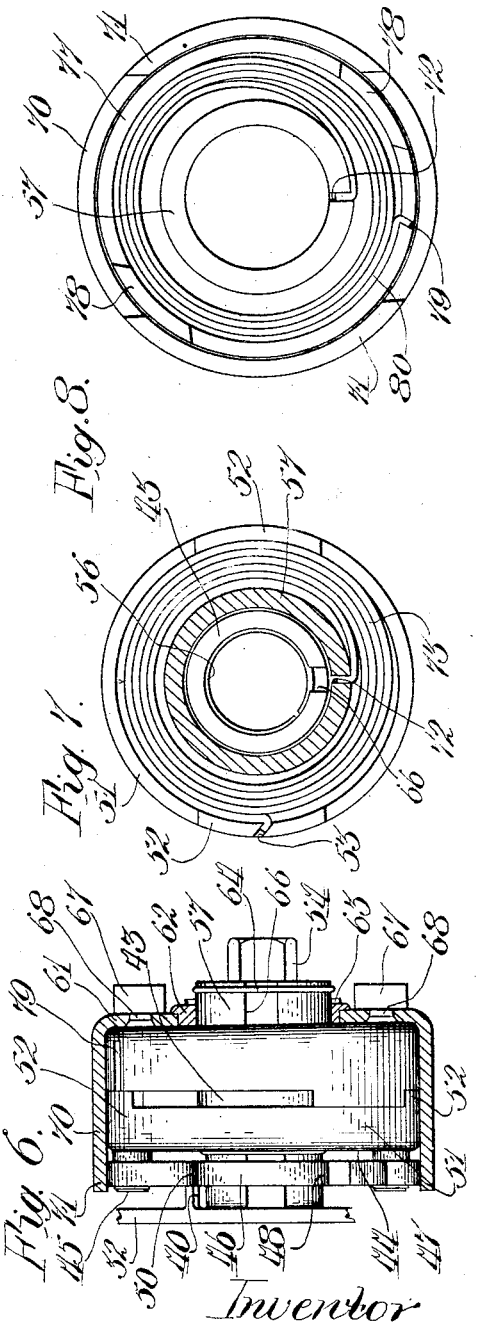
Inventor
Leopold F. Burger

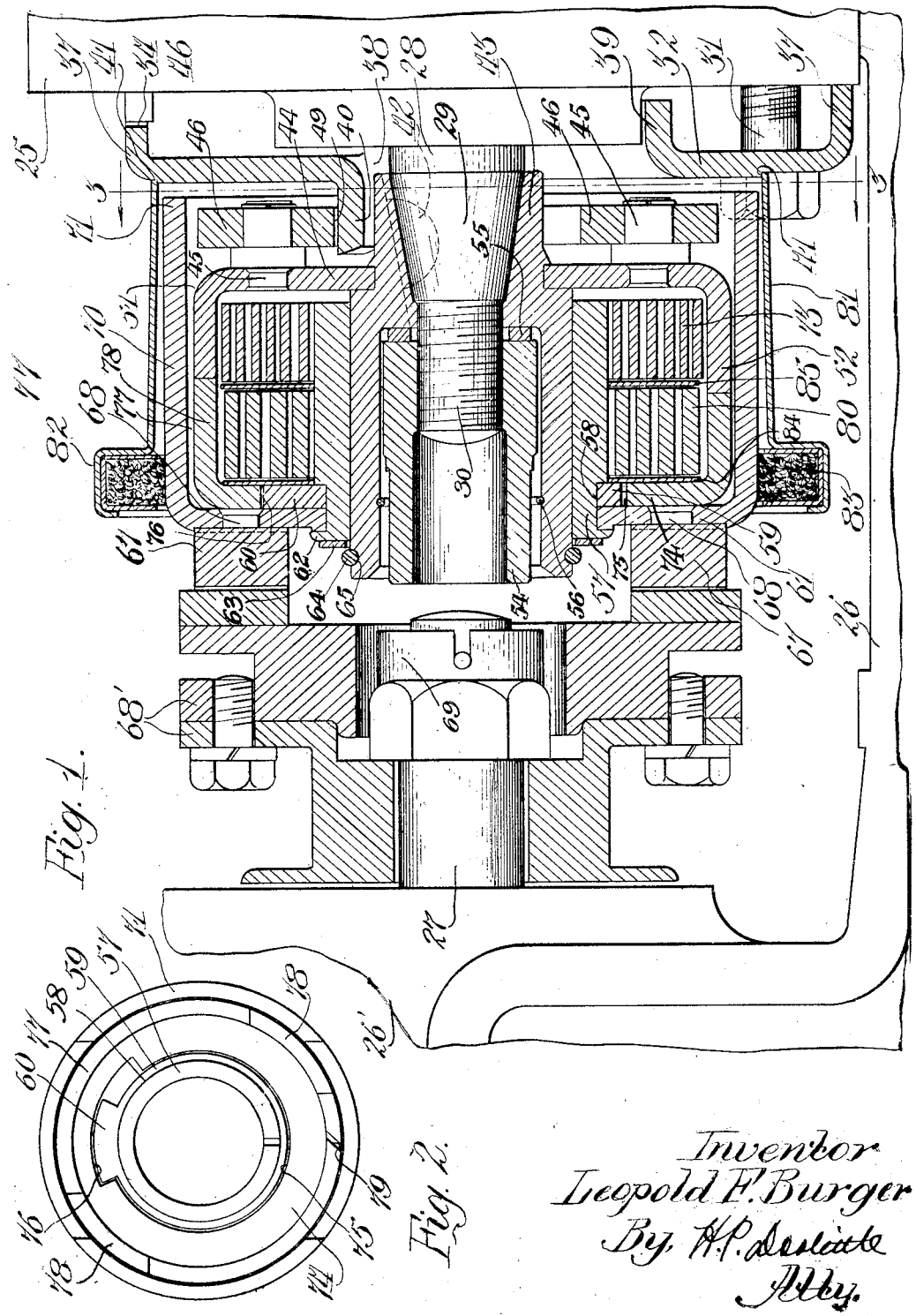

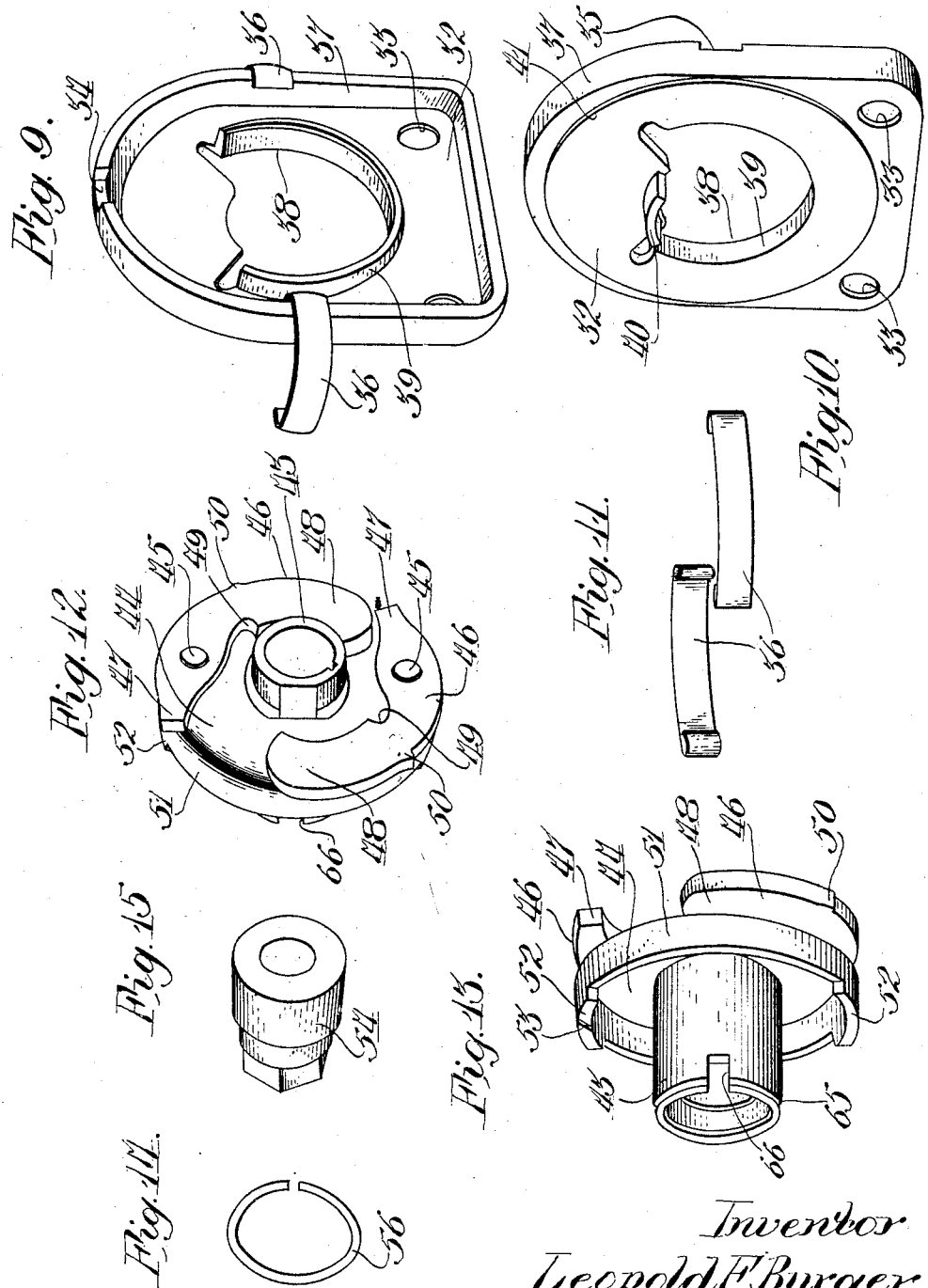

Feb. 24, 1931. L. F. BURGER 1,793,586
AUTOMATIC IMPULSE COUPLING FOR MAGNETOS
Filed May 19, 1928 4 Sheets-Sheet 4
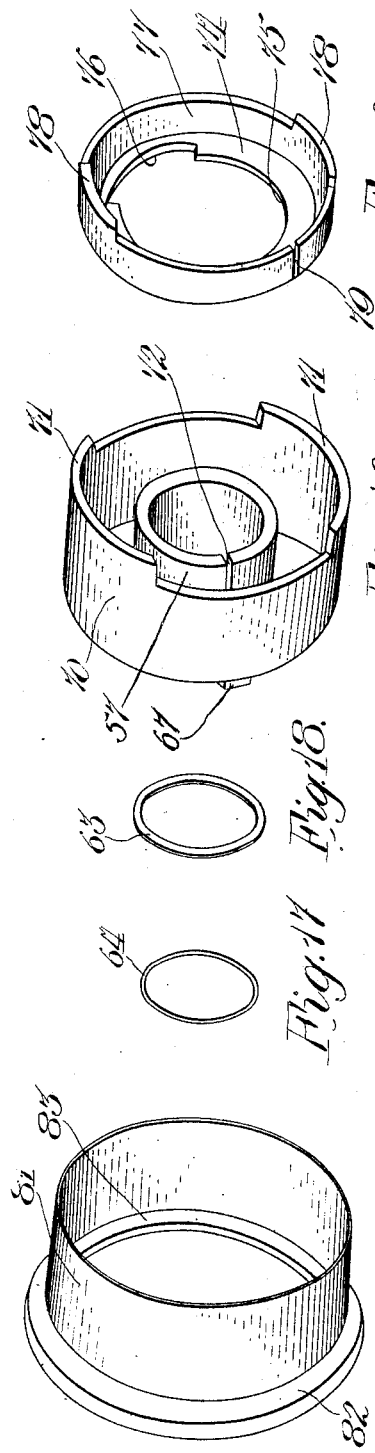
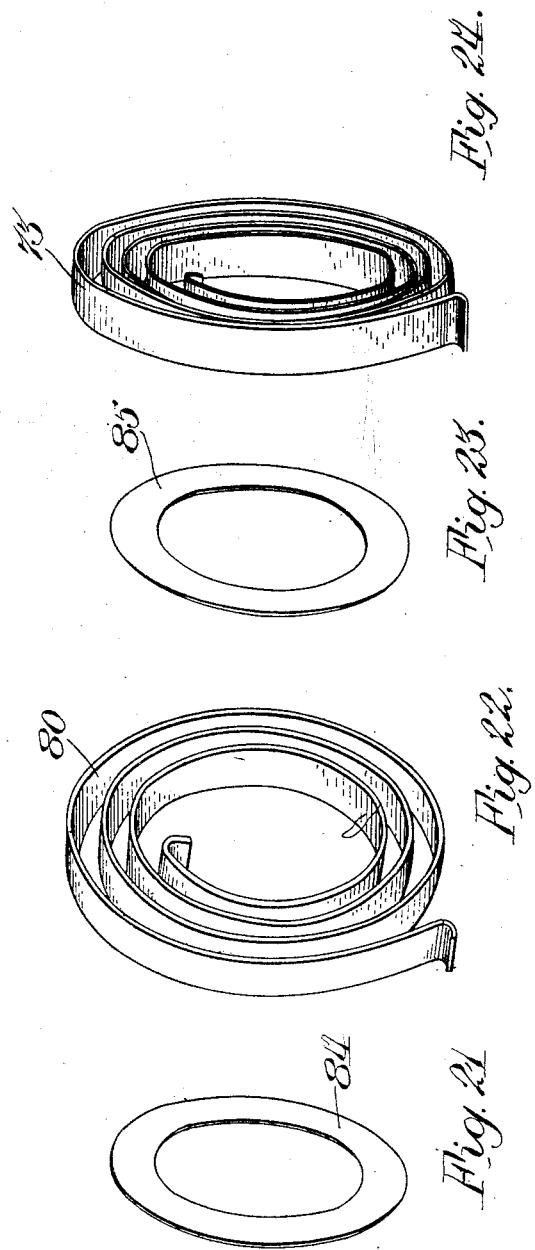
Inventor
Leopold F. Burger
By H. A. Doolittle
Atty Patented Feb. 24, 1931

1,793,586

UNITED STATES PATENT OFFICE

LEOPOLD F. BURGER, OF RIVERSIDE, ILLINOIS, ASSIGNOR TO INTERNATIONAL HARVESTER COMPANY, A CORPORATION OF NEW JERSEY

AUTOMATIC IMPULSE COUPLING FOR MAGNETOS

Application filed May 19, 1928. Serial No. 278,968.

This invention relates to improvements in a driving device for magneto generators. Such devices are commonly designated as impulse couplings or starters.

As is well known in the art, the magneto which supplies the electrical spark for the ignition devices of an internal combustion engine is driven from the engine, and, as a result, when the engine is turning over slowly, as when starting, necessarily the magneto also must be turning over slowly, and, as a result, the magneto at such times cannot deliver that necessary hot spark required for ignition purposes within the engine. Impulse couplings, therefore, are used between the engine and magneto drive to correct this deficiency by turning over the magneto armature, when the engine is running slowly, momentarily at a greater speed than the engine, such momentary magneto acceleration being timed to take place at the moment the respective pistons of the engine are on their compression strokes because that is when ignition is effected and thus the magneto can deliver at this time the necessary hot spark. Impulse couplings, therefore, cause the magneto to supply sparks of high intensity independently of the engine speed, such sparks being equal to those delivered by the magneto when the engine is running at normal speed.

Briefly, such couplings comprise a driven part secured to the magneto shaft or rotor, a driving part connected with an accessory engine drive shaft and having a resilient member forming a driving connection between the driving and driven parts. A latch means is used momentarily to stop the driven part to hold the magneto shaft stationary for a predetermined period, this stopping of the driven parts causing the resilient means to become energized, due to the driving part having been driven ahead of the driven part. Now, when the latch is released, of course, the driven part and magneto shaft are impelled ahead under the power of the resilient means, causing the magneto to generate the requisite hot spark.

This alternate starting and sudden stopping of the driven part causes wear and breakage, due to the great shocks to which this part is necessarily subjected. Objectionable noise is also an incident to this hammering action when the driven part stops. Most couplings, furthermore, have their parts exposed to dust and dirt, which causes wear.

With this introductory statement in mind, it is the main object of the invention generally to improve the construction and operation of impulse couplings of the kind mentioned. More particular objects are to provide a novel form of buffer or shock absorbing means interposed between the driving and driven parts in such a manner that the severe shocks to which the driven parts are subjected will be materially lessened with a resultant greater longevity for the coupling parts; to lessen the noise of operation; to enclose the parts in a dirt proof casing; to minimize the wear on parts; and, lastly, to provide a coupling having a maximum number of sheet metal parts which can be easily worked and machined to the end that the coupling may be practicable from a manufacturing viewpoint.

Other and further objects of this invention will be apparent to anyone skilled in this art after reading the specification with reference to the accompanying sheets of drawings, wherein is illustrated a practicable embodiment of the invention. In these drawings:

Figure 1 is a general, vertical sectional view through the assembled impulse coupling, the view showing the coupling associated with the armature shaft of a magneto. The showing is twice actual size;

Figure 2 is an inside face view, actual size, of the driving member and the buffer shell, minus the buffer spring fitted thereinto;

Figure 3 is a face view of the assembled coupling, with the dust proof cover removed, as seen along the line 3—3 of Figure 1, looking in the direction of the arrows, the armature shaft of the magneto and an abutment appearing in section;

Figure 4 is a view similar to the showing in Figure 3, the parts, however, assuming a somewhat different position;

Figure 5 is a side view of the assembled coupling, with the driving member shown in section to show the relative angular positions of the buffer shell and driven part, just prior to the moment the driven part is impulsed ahead;

Figure 6 is a view similar to Figure 5, but showing the position of the parts just as the winding action on the impulsing spring is initiated;

Figure 7 is an inside face view of the driven part showing the manner of connecting the impulsing spring between the rim of said driven part and the hub of the driving part;

Figure 8 is a view like Figure 2, but additionally showing the manner of connecting the buffer spring between the rim of the buffer shell and the hub of the driving part;

Figure 9 is an isolated, rear perspective view of the abutment plate which is to be carried on the magneto frame;

Figure 10 is an isolated, front perspective view of the same part;

Figure 11 shows perspective views of the two lock members for securing the dust proof housing to the abutment plate;

Figure 12 is an isolated, outside perspective view of the driven member;

Figure 13 is an isolated, inside perspective view of the driven member;

Figures 14 and 15 are isolated, detail perspective views of certain locking parts;

Figure 16 is an isolated, perspective view of the dust proof housing;

Figure 17 and 18 show in perspective two more locking parts;

Figure 19 is an isolated, inside perspective view of the driving part;

Figure 20 is an isolated, inside perspective view of the buffer shell; and

Figures 21, 22, 23 and 24 are isolated perspective views, respectively, of a washer; the buffer spring; another washer; and the driving or impulsing spring, all of these parts being shown in the order of their arrangement when the coupling has been assembled.

Referring now to Figure 1 of the drawings, it will be seen that a portion of a magneto has been shown at 25, the same being conventionally carried on an engine accessory bracket 26 having a part 26' spaced from the magneto. The part 26' carries a shaft 27 driven from any suitable part of the engine, in this instance the shaft being run in a clockwise direction as viewed from left to right in the drawings. In line with the shaft 27, the magneto is provided with the usual armature or magneto shaft 28 having a tapering, protruding end 29 terminating in a threaded portion 30.

The impulse coupling of which this invention is the subject-matter is interposed between the engine driven shaft 27 and the shaft 28 of the magneto, the purpose of the coupling, as has been stated, being to cause the magneto shaft to rotate at an intermittently accelerated speed with respect to that of the engine driven shaft when starting the engine from rest.

The magneto has securely mounted on its frame, by means of screw bolts 31, an abutment plate 32, said plate having holes 33, as shown in Figures 1, 9 and 10, for the reception of said screw bolts. Said plate 32 has at its top a centering notch 34 and at each side a notch 35, the side notches designed for the reception of detachable spring clips 36, also shown in Figure 11. This abutment plate in practice will be a sheet metal stamping having its entire peripheral edge formed with an offset wall or extension 37 extending in the direction of the magneto and snugly fitting thereagainst in a manner to permit the space between the magneto face and the face of the abutment plate to be packed with a fibrous packing, not shown, in a manner best to exclude dirt and the like. The face of this plate is formed with a substantially central opening 38 of relatively large size, to permit protrusion of the magneto armature shaft 28 therethrough, as best shown in Figure 1. The hole 38 when in the stamping process of manufacture will be delimited throughout most of its edge with a strengthening rib 39 protruding from its back side in the direction of the magneto. The upper, top, front face of this plate is provided at the top edge of the opening 38 with an integrally formed abutment 40, extending a short distance in a direction away from the magneto. The front face of the abutment plate 32 is formed with a circular upset 41, as best shown in Figures 1 and 10. The purpose of the upset just described will later appear. The driven part of the coupling and its mounting will next be described.

Securely fastened to the tapered part 29 of the magneto armature shaft, by means of a key 42, is the correspondingly tapered portion of an elongated hub 43 extending away from the magneto a substantial distance, as shown. This hub (see Figures 1, 12 and 13) carries intermediately of its ends, a circular disk 44, which at diametrically opposite points carries rivets 45 extending in the direction of the magneto; each rivet, of which there are two, pivotally carrying a latch 46. See also Figures 3 and 4, where it can be seen that each latch has a tail 47, a relatively long, weighted end 48, an inner notch 49 adapted to engage the abutment 40 as will later appear, and a small nib 50. The disk 44, which in practice will be a stamping is formed with a rim 51 directed away from the magneto, and, at diametrically opposed points, said rim is provided with two extensions 52 as continuations of the rim and each extension of a circumferential or angular length, in this embodiment of the invention, of substantially 40 degrees. For convenience of manufacture, the end edges of these extensions will be finished parallel to each other and to the opposite extension edges as well (see Figure 7). One of the extensions 52 is formed with a slot 53 for a purpose later to be made apparent. It can now be appreciated that the driven part comprises the hub 43 and the disk cup 44. Additional securing means for the driven part is provided by means of an elongated nut 54 (see Figure 15) screwed tight on the threaded end 30 of the armature magneto shaft, as best shown in Figure 1. A split ring, spring washer 55 prevents unloosening of this nut. Still another lock is provided in the form of a spring ring 56 (see Figure 14) secured in an internal groove in the hub 43. This lock ring is more in the nature of a stop to prevent displacement of the nut 54. The ring is effective as a stop when the shoulder on the nut 54, shown in Figure 1 (just to the right of the ring), contacts the ring. It functions as a retainer ring mainly when the impulse coupling as a unit has been removed from the magneto shaft to prevent falling out of said nut 54, as will be clear. This completes the description, and manner of mounting, of the driven part. Next to be described will be the driving part.

This driving part includes a hub part 57 slid concentrically and rotatably over the hub 43 of the driven part, as best shown in Figure 1, said hub 57 having a reduced portion 58 onto which is drive fitted a ring 59 including a radially extending driver part 60, shown also in Figure 2. After this driver part is fitted onto the reduced hub end and forced all the way home to its stop, as shown in Figure 1, the main driving part, in the form of a circular disk 61, is slid, with a drive fit, over the hub 57, and the end of said hub is then swaged over at 62 securely to lock the parts 59 and 61 to the hub to form therewith a single driving part. Endwise displacement of the hub of the driving part from the hub of the driven part is prevented by means of a washer 63 (see Figure 18) locked in place by means of a spring lock ring 64 (see Figure 17) fitted into an appropriate groove 65 for this purpose. A slot 66 permits an entrance for displacing said ring 64, should occasion require it (see Figure 13).

The circular disk 61 carries on its outer face, that is, the face remote from the magneto, two tongues 67 oppositely arranged on a diametrical line, which tongues are secured to said disk by means of rivets 68 (see Figures 1, 6 and 19). These tongues fit complementary grooves in a driving head 68' made fast to the supplementary engine driven shaft 27 by means of a nut 69. This tongue and groove driving connection is standard in the art and is commonly employed in driving the driving part of an impulse coupling, and for this reason greater detail of description is deemed unnecessary.

Going back to the main driving part of the impulse coupling, it will be seen that the disk 61, which is formed as an integral stamping, is provided with a relatively wide rim 70 extending in the direction of the magneto, said structure being best shown in Figures 1 and 19. This rim is disposed outwardly in a radial direction of the rim 51 of the driven part, as shown in Figure 1. As shown in Figure 19, the rim 70 includes two oppositely disposed extensions 71 overhanging the latches 46 for a purpose later to appear. The ends of these extensions are parallel to each other and to the opposite extension ends as well, for convenience of manufacture, (see Figure 8). Each extension is of an angular length substantially approximating 80 degrees in the embodiment herein shown. The hub 57 to which this disk 61 is permanently secured is provided with a long slot 72, as shown. From this description it must now be appreciated that the driving member of the impulse coupling is a unit composed of the hub part 57, the disk 61 with its rim, and the driver part 59 with its extension 60.

The hub 57 of the driving part is resiliently connected to the rim extension 52 of the driven part by a driving and impelling spring 73 (see Figure 24). This spring is a clock type, flat, spiral, coil spring, and has one end securely locked in the slot 72 of the driving hub 57 and its other end similarly locked in the slot 53 of the extension 52 on the rim of the driven part. The assembly of these parts is best shown in Figure 7, where it can be seen that this driving spring is disposed to encircle the hub 57.

Interposed between the driving and driven parts is a novel shock absorbing or buffer means which functions to minimize the shock occurring every time the acceleration of the driven part is stopped. This buffer part, as shown in isolated perspective in Figure 20, comprises a stamped, circular disk 74 provided with a large concentric opening 75 including an offset slot 76 of an angular length approximating 70 degrees (see Figure 2). This buffer disk, when assembled in the coupling, as appears in Figure 1, includes a rim 77 extending in the direction of the magneto, which rim has formed thereon two diametrically, oppositely disposed extensions 78, each extension being of an angular length of approximately 45 degrees. The rim 77 furthermore, adjacent one of the extensions 78, is formed with a slot 79. A relatively heavy clock type, flat, spiral, coil, buffer spring 80 is enclosed in this buffer shell by having one of its ends anchored in the slot 79 of the rim and its other end anchored in the slot 72 of the hub 57 of the driving part. The next part of the coupling to be described is the dirt and dust proof housing, shown in Figures 1 and 16.

In these views it will be seen that the housing comprises a sheet metal sleeve 81 having an annular beaded pocket 82 at one end designed for the reception of a packing ring 83 to make a dust proof joint. The opposite end of the housing sleeve slips over the upset 41 on the abutment plate 32 to prevent its displacement. The snap clips 36 securely and detachably hold the cover in place, one end of the clips 36 engaging the notches 35 in the abutment plate and the other end of the clips engaging the beaded edge 82, as will be understood. The manner of assembling the impulse coupling will next be described.

It will be assumed that the abutment plate 32 has been secured to the magneto frame in the manner described and as best shown in Figure 1. The driven part is then secured to the armature shaft of the magneto by means of the key 42 and the nut 54. The latches 46 of the driven part are now in a position to engage their notches 49 on the abutment 40 of the abutment plate. The driving part then has the buffer shell 74 fitted thereinto over its hub 57 in such a manner that the slot 76 of the shell fits over the extension 60 of the driving part, as shown in Figure 2. A washer 84 (see Figures 1 and 21) is then slid over the hub 57. Next in order comes the buffer spring 80 having one end anchored in the slot 72 of the hub of the driving part and its other end anchored in the slot 79 in the rim of the buffer shell, (see Figure 7). This spring is stressed before it is locked in the shell and as its ends are anchored, the spring 80 is always under pressure. Thus, the buffer spring is far more efficient than if it were not kept under stress, and is not so easily broken. The tendency of the spring being to unwind itself, which it cannot do because of its fixed anchors, causes the buffer shell to be maintained in a position with one end of its slot 76 tightly abutting the adjacent end of the radial extension 60 of the driven part (see Figure 2). This is possible because the buffer shell is to some extent relatively rotatable with respect to the driving part, and because the driven part extension 60 is of shorter angular length than the slot 76. The assembled driving part and buffer is now ready for association with the driven part. A washer 85 is now laid against the buffer spring (see Figures 1 and 23). Then the driver or impelling spring 73 is fitted into the driven part by having one end anchored in the slot 53 of the driven part and the other end anchored in the slot 72 in the hub of the driving part. After this, the driving part with the buffer is fitted over the hub 43 of the driven part in a manner to cause the extensions 71 to overhang the latches 46. At the same time the buffer shell extensions 78 dovetail between the extensions 52 of the driven part, as shown in Figures 1, 5 and 6.

The lock ring 64 is then put in place as has been described. When the driving head 68 is coupled with the tongues 67 of the driving part and the parts have been enclosed by the shell 81, the impulse coupling is assembled and ready for operation, which will now be described.

The driving head 68 is being turned in a clockwise direction by the engine and, due to its positive connection 67 with the driving shell 70, the driving part also turns clockwise. We will assume that the engine is just starting, its rotative speed being slow, which causes one of the latches 46 (that one which happens to be uppermost at the time) to gravitate in a manner causing its notch 49 to lock over the abutment 40 of the abutment plate 32. This starting position of the parts is shown in Figure 3. In the meantime it will be remembered that the buffer spring 80, which is always under stress, tends to unwind itself, but, due to its fixed anchors, it cannot do this. However, the net result of this unwinding tendency is to cause the buffer shell to rotate slightly, relatively to the driving part, in such a manner that the left hand end of the slot 76, as seen in Figure 2, is held tightly against the left hand end of the radial driving extension 60 of the driving disk part 59, movable as a unit with the driving part 61. This means that, as the said driving part rotates, it carries with it the buffer shell 74. As the buffer spring 80 is anchored between the driving part and buffer part, and, as these two parts rotate together, naturally the buffer spring is not wound up, but retains its initial compression. The continued rotation of the driving parts now causes the driving spring 73 to be wound up, as the driven part is locked by the latch 46 and cannot turn. The amount of winding of this spring is limited by the angular length of the clearance between the extensions 52 on the driven part, as best appears in Figure 5. Just before the end of the extension 78 of the buffer rim 77 is about to contact the adjacent edge of the extension 52 on the rim of the stationary driven part, as appears in Figure 5, one of the overhanging extensions 71 of the driving part contacts the raised tail portion 47 of the holding latch 46, as appears in Figure 4, and pivots said latch to cause it to be released from the abutment 40. Immediately the stored up energy of the spring 73 rapidly drives or impulses the driven part ahead and, as this part is secured to the magneto shaft, necessarily the magneto shaft and its armature are impulsed through the field of the magneto, thereby producing that necessary hot spark for ignition purposes in the engine. At this time the nib 20 prevents frictional contact of the entire surface of the back side of the latch with the extension 71, as can be seen.

Still looking at Figure 5, the impulsed travel of the driven part must be limited when the lower extension 52 thereof, as seen in the figure, strikes the lower end of the extension 78 on the buffer shell. This buffer extension 78 is, therefore, given such a blow that it causes the buffer shell to rotate slightly ahead, as permitted by the greater angular length of the slot 76 as compared with the angular length of the driver extension 60. The buffer recoil, of course, is against the compression of the buffer spring which absorbs and minimizes the shock. As soon as the shock has been absorbed, the natural unwinding action of the buffer spring returns the buffer shell to its normal, home driving seat against the driving extension 60, as shown in Figure 2, and previously mentioned. In the meantime the opposite latch 46 catches the abutment 40, and the same operation is repeated. This continues intermittently then, as will be understood, until the engine speed gets up to such normal speed as permits efficient spark generation in the magneto without the impulsing action. The centrifugal force developed by such rotative speed throws the latches, due to their heavy ends 48, outwardly and free of the abutment 40, so that the latches no longer can engage the abutment. The drive for the magneto is then directly through the driving spring 73, as will be understood. If excessive load slows down the rotative speed of the engine, then the impulse coupling automatically acts again as the force of gravity will then overcome the centrifugal force, causing the latches once again to engage the abutment 40. The impulse coupling of this invention is, therefore, of the full, automatic type.

From this detailed disclosure, it must now be obvious that an improved impulse coupling has been provided which achieves all of the desirable objects heretofore recited.

It is to be understood that it is intended to cover all such changes and modifications of the illustrative embodiment herein disclosed as do not materially depart from the spirit and scope of the invention, as is indicated in the following claims.

What is claimed is:

1. In an impulse coupling, a driving member, a driven member connected to a magneto shaft, an intermediate member, a spring between the intermediate member and the driving member, and a spring between the driving member and the driven member.

2. In an impulse coupling, a driving member, a driven member connected to a magneto shaft, an intermediate member, a spring having one end anchored to the intermediate member and its other end anchored to the driving member, and a second spring connected between the driving and driven members.

3. In an impulse coupling, a driving member, a driven member, an intermediate member, a constantly tensioned buffer spring anchored between the driving and intermediate members, and a driving spring between the driving and driven members.

4. In an impulse coupling, a rotatable driving member, a rotatable driven member, an intermediate member having a slight rotative movement relative to the driving member, a tensioned buffer spring anchored between the driving and intermediate members, and a driving spring between the driving and driven members.

5. In an impulse coupling, a driving member, a driven member, an intermediate member, a spiral buffer spring anchored between the driving and intermediate members, and a spiral driving spring between the driving and driven members.

6. In an impulse coupling, a driven member having a hub fast on a magneto shaft and extending therefrom, a driving member having a hub on the extended hub of the driven member, a buffer member movable with the driving member, a buffer spring secured at one end to the hub of the driving member and at its other end to the buffer member, and a driving spring secured at one end to the hub of the driving member and at its other end to the driven member.

7. In an impulse coupling, a driven member having a hub fast on a magneto shaft and extending therefrom, a driving member having a hub on the extended hub of the driven member, a buffer member movable with the driving member, a tensioned buffer spring anchored between the hub of the driving member and the buffer member, and a driving spring connected between the driving and driven members.

8. In an impulse coupling, a driven member having a hub fast on a magneto shaft and extending therefrom, a driving member having a hub on the extended hub of the driven member, a buffer member movable with the driving member, a buffer spring connected between the driving member and the buffer member, and a driving spring connected between the driving and driven members, each of said springs arranged concentrically around the hub of the driving member.

9. In an impulse coupling, a driven member having a hub fast on a magneto shaft and extending therefrom, a driving member having a hub on the extended hub of the driven member, a buffer member movable with the driving member, a flat spiral buffer spring secured at one end to the hub of the driving member and at its other end to the buffer member, a flat spiral driving spring secured at one end to the hub of the driving member and at its other end to the driven member, each of said springs arranged concentrically around the hub of the driving member, and a loose separator between said springs.

10. In an impulse coupling, a driving member, a buffer member having a driving connection with the driving member, a rim for the buffer provided with an extension, a buffer spring between the buffer and driving member, a driven member having a rim and extension, said extension cooperating with the buffer extension, and a driving spring between the driving and driven members.

11. In an impulse coupling, a driving member, a buffer member, means for driving the buffer from the driving member, a rim for the buffer, a spring enclosed by said rim and having connections with the driving member and buffer, a driven member having a rim, a spring enclosed by the rim and having connections with the driving and driven members, and cooperating extensions between the buffer member and driven member.

12. In an impulse coupling, a driving member having a hub, a buffer member, means for driving the buffer member from the driving member, a rim on the buffer member, a tensioned buffer spring anchored to the hub of the driving member and to the rim of the buffer member, a driven member having a rim, a driving spring anchored to the hub of the driving member and to the rim of the driven member, and cooperating extensions between the buffer member and driven member.

13. In an impulse coupling, a driving member having a hub, a buffer member, means for driving the buffer member from the driving member, a rim on the buffer member, a tensioned buffer spring anchored to the hub of the driving member and to the rim of the buffer member, a driven member including a hub inside the hub of the driving member, a rim on the driven member, and a driving spring between the rim of the driven member and the hub of the driving member, said buffer rim and driven member rim having cooperating buffer extensions.

14. In an impulse coupling, a driving member having a hub, a buffer member, means for driving the buffer member from the driving member, a rim on the buffer member, a buffer spring anchored to the rim of the buffer and to the hub of the driving member, a driven member having a hub inside the hub of the driving member, said driven member including a rim, a driving spring anchored to the rim of the driven member and to the hub of the driving member, and cooperation buffer extensions on the buffer rim and driven member rim.

15. In an impulse coupling, a driving member having a hub, a buffer member, means for driving the buffer member from the driving member, a spiral spring between the buffer member and hub of the driving member, said spring arranged concentrically around said hub, a driven member having a hub inside the hub of the driving member, a spiral spring between the driven member and the hub of the driving member, said spring arranged concentrically around the hub of the driving member adjacent said first mentioned spring, a separator between said springs, and cooperating extensions between the buffer member and the driven member.

16. In an impulse coupling, a driving member, a driving extension included in said driving member, a buffer member having a slot engaged by said extension to drive the buffer member, a buffer spring between the driving member and buffer member, a driven member, a driving spring between the driving member and driven member, and extensions between the buffer member and driven member.

17. In an impulse coupling, a hub having a reduced portion, a driving member on the reduced portion, a disk having a driving extension also on the reduced portion, means locking the member and disk on the reduced portion of the hub to form a unit therewith, a buffer member having a slot engageable by said extension to drive the buffer member, a buffer spring between the hub and buffer member, a driven member, a driving spring between the hub and the driven member, and extensions between the buffer member and the driven member.

18. In an impulse coupling, a driving member, a buffer member driven directly thereby, a buffer spring between the driving member and the buffer member, a driven member, a driving spring between the driving and driven members, a stationary abutment adjacent the driven member, a latch on the driven member engageable with the abutment to lock the driven member against rotation to wind the driving spring, and means on the driving member for disengaging the latch from the abutment to cause the driven member to be impulsed.

19. In an impulse coupling, a driving member, a buffer member, means for driving the buffer member with the driving member, a tensioned buffer spring anchored at one end to the buffer member and at its other end to the driving member, a driven member, a driving spring between the driving and driven members, a stationary abutment adjacent the driven member, a latch pivotally carried on the driven member and engageable with the abutment to lock the driven member against rotation to wind the driving spring, and means on the driving member for disengaging the latch from the abutment to cause the driven member to be impulsed.

20. In an impulse coupling, a driving member having a hub, a buffer member, means for driving the buffer member with the driving member, a buffer spring between the buffer and the hub of the driving member, a driven member having a hub inside the hub of the driving member, a driving spring between the hub of the driving member and the driven member, a stationary abutment adjacent the driven member, means engageable with said abutment to lock the driven member against rotation to wind the driving spring, means to release said means to cause the driven member to be impulsed, and cooperating extensions between the buffer and driven members.

21. In an impulse coupling, a driving member having a hub, a buffer member having a rim, means for driving the buffer member from the driving member, a spiral buffer spring enclosed by the buffer rim and connected between the buffer member and the hub of the driving member, a driven member having a hub inside the hub of the driving member, a rim on the driven member, a spiral driving spring connected between the driving hub and the driven member and enclosed by the rim of the driven member, a stationary abutment adjacent the driven member, means engageable with said abutment to lock the driven member against rotation to wind the driving spring, means to release said means to cause the driven member to be impulsed, and cooperating extensions on the rims of the buffer and driven members.

22. In an impulse coupling, a driving member having a rim, a buffer member movable with the driving member, a buffer spring between the buffer member and driving member, a driven member, a spring between the driving and driven members, a stationary abutment adjacent the driven member, means on the driven member for engaging said abutment to lock the driven member against rotation, and extensions on the rim of the driving member for releasing the lock means.

23. In an impulse coupling, a driving member having a rim, a buffer member movable with the driving member, a buffer spring between the buffer member and driving member, a driven member, a spring between the driving and driven members, a stationary abutment adjacent the driven member, a latch pivotally carried on the driven member for engaging said abutment to lock the driven member against rotation, and an extension on the rim of the driving member overhanging the latch to engage a portion thereof to release the same from the abutment.

24. In an impulse coupling, a driving member having a rim, a buffer member having a rim inside the rim of the driving member, means for driving the buffer member from the driving member, a buffer spring connected between the driving member and the buffer member, a driven member having a rim inside the rim of the driving member, a driving spring connected between the driving and driven members, cooperating extensions between the rims of the buffer and driven members, latches on the driven member, a stationary abutment adjacent the driven member with which the latches are adapted to engage one at a time to lock the driven member against rotation, and extensions on the rim of the driving member acting one at a time to release the latches from the abutments.

25. In an impulse coupling, a driving member having a hub and a rim, a buffer member having a rim inside the rim of the driving member, means for driving the buffer member from the driving member, a spiral buffer spring connected between the rim of the buffer member and the hub of the driving member, a driven member having a rim inside the rim of the driving member and having extensions cooperating with complementary extensions on the rim of the buffer member, a spiral driving spring connected between the hub of the driving member and the rim of the driven member, a separator between the two springs, latches on the driven member, a stationary abutment adjacent the driven member with which the latches are adapted to engage one at a time to lock the driven member against rotation, and extensions on the rim of the driving member to engage a portion of the latches to release the same from the abutment, said extensions acting one at a time.

26. In an impulse coupling, the combination of driving and driven members, a resilient driving connection between said members, and a flat, spiral, coil spring normally under stress to act as a buffer for the driven member when it is stopped after each impulse.

27. In an impulse coupling, a driving member, a driven member connected to a magneto shaft, an intermediate member, a resilient shock absorbing means between the intermediate member and the driving member, and a spring driving connection between the driving and driven members.

28. In an impulse coupling, driving member, a driven member, an intermediate member, a resilient cushion between the driving and intermediate members, and a spiral driving spring between the driving and driven members.

In testimony whereof I affix my signature.

LEOPOLD F. BURGER.